Sept. 16, 1930. A. WALLACE 1,776,174
ELECTRIC LOCOMOTIVE TRUCK
Filed Oct. 7, 1929 2 Sheets-Sheet 1
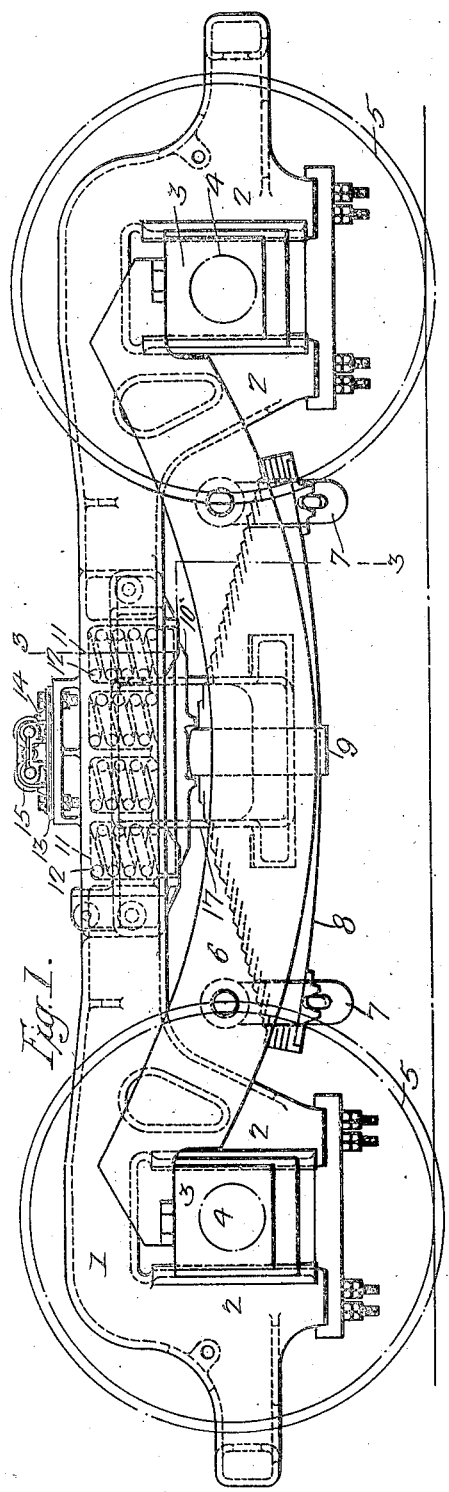
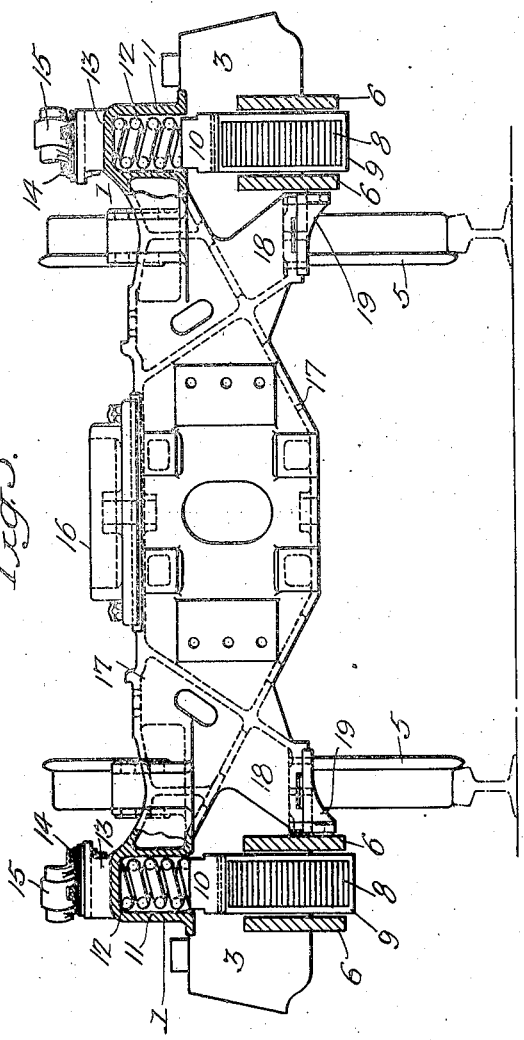
Inventor:
Allen Wallace
by his Attorneys

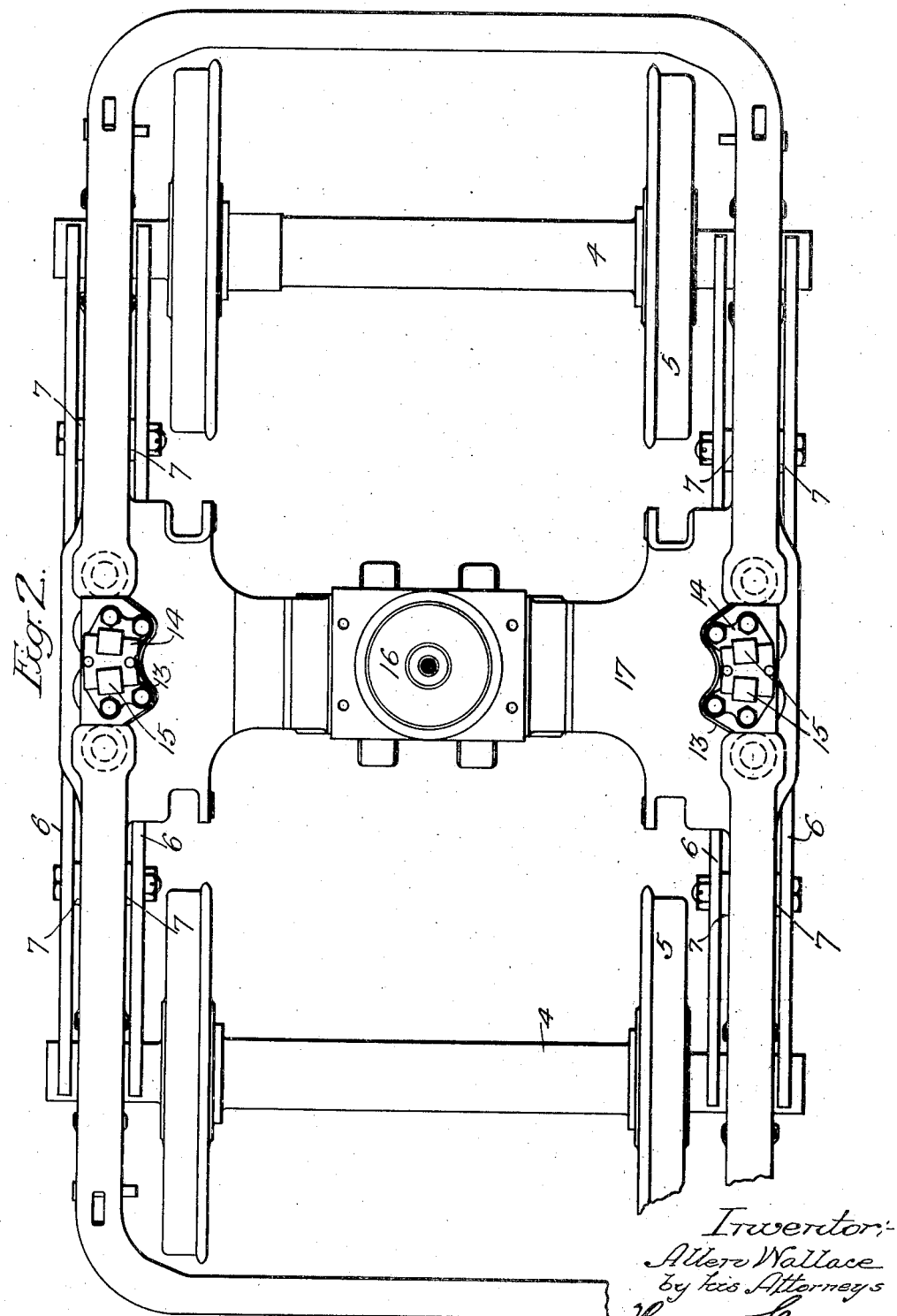

Patented Sept. 16, 1930

1,776,174

UNITED STATES PATENT OFFICE

ALLEN WALLACE, OF MOORESTOWN, NEW JERSEY

ELECTRIC LOCOMOTIVE TRUCK

Application filed October 7, 1929. Serial No. 398,034.

My invention relates to certain improvements in railway trucks which are especially adapted for use in connection with electric locomotives, but it will be understood that the invention can be used under rolling stock of any type.

The object of my invention is to combine a semi-elliptical spring with a series of coil springs, the semi-elliptical spring at each side of the truck being suspended from the equalizing beams.

A further object of the invention is to so design the truck that the coil springs will be located in a housing formed integral with the frame of the truck.

In the accompanying drawing:

Fig. 1 is a side view of my improved electric locomotive truck;

Fig. 2 is a plan view; and

Fig. 3 is a sectional view on the line 3—3, Fig. 1.

1 is the frame of the truck, having side members. The frame may be made as an integral casting. Formed on the side members of the frame are the pedestals 2, for the boxes 3, for the axles 4, on which are the wheels 5.

Extending longitudinally on each side of each side member of the frame of the truck are equalizing beams 6. These beams rest at each end upon the boxes 3. The beams are shown curved in the present instance but they may be made in other shapes without departing from the main features of the invention.

Suspended from the equalizing beams 6, at each side of the truck by links 7, is a semi-elliptical spring 8, having the band 9 at the center in this instance, although its location may be varied longitudinally.

Resting on the spring is a spring plate 10, which is guided at its upper end in the housing in the frame 1. In this housing are a series of pockets 11 and in each pocket is a coiled spring 12, which rests upon the spring plate 10, so that the frame is carried by the equalizing beams through the semi-elliptical spring 8, spring plate 10 and the series of coil springs 12, at each side of the truck.

Projecting vertically from each side of the truck are platforms 13 in the present instance, on which are bearings 14, carrying rollers 15, which form the side bearings for the truck. These side bearings may be modified if desired.

The center bearing 16 is secured to the cross beam 17, which in the present instance is formed integral with the truck frame. This cross beam is shaped to support the overhanging portions of the electric motors which are carried by the axles.

Depending from each end of the cross beam are brackets 18 on which are adjustably mounted plates 19, which act as buffer plates for the equalizing beams 6—6 and also help to hold the brake-shoes in adjustment.

It will be seen by the above construction that my improved truck is designed to carry heavy weights, such as the body of an electric locomotive, as the weight is carried by the two sets of equalizing beams through the medium of the semi-elliptical springs and series of coil springs and it will be understood that the number of coil springs will vary according to the amount of load to be carried.

I claim:

1. The combination in a truck, of a frame; axle boxes mounted in the frame; equalizing beams on each side of the truck resting upon the boxes; semi-elliptical springs suspended from the said equalizing beams; a spring plate on each semi-elliptical spring; and a series of coil springs above the semi-elliptical springs and located between the spring plate and the frame of the truck.

2. The combination in a truck, of a frame having pedestals formed thereon; axle boxes mounted in the pedestals; equalizing beams resting upon the boxes; semi-elliptical springs at each side of the truck, suspended from the equalizing beams; a spring plate mounted on the semi-elliptical spring, the frame of the truck having a series of pockets; and coil springs located in the pockets and resting upon the spring plate.

3. The combination in an electric locomotive truck, of an integral frame having sides members and a cross beam and having pedestals formed integral therewith; a center plate mounted on the cross beam; a pair of equalizing beams located at each side of the truck, one beam of each pair resting upon the axle boxes on the outside of the side member of the frame, the other beam resting upon the boxes at the inner side of the side member of the frame; a semi-elliptical spring located between the two beams; links suspending the spring from the beams; a spring plate mounted on the semi-elliptical spring and guided by the frame; and a series of coil springs resting upon the spring plate, said springs being located in pockets formed integral with the frame of the truck.

4. The combination in a car truck, of a frame having pedestals; boxes mounted between the pedestals; equalizing beams extending longitudinally to the frame and resting upon the boxes; a semi-elliptical spring suspended from the beams at each side of the truck; coil springs carried between two longitudinal springs and located in the housing of the frame; a cross beam formed integral with the frame of the truck; brackets pending from the cross beam; and plates adjustably secured to the brackets, acting as buffers for the longitudinal equalizing beams.

ALLEN WALLACE.